United States Patent
Holzhauer et al.

(10) Patent No.: US 10,476,902 B2
(45) Date of Patent: Nov. 12, 2019

(54) THREAT DETECTION FOR A FLEET OF INDUSTRIAL ASSETS

(71) Applicant: General Electric Company, Schenectady, NY (US)

(72) Inventors: Daniel Francis Holzhauer, Santa Clarita, CA (US); Masoud Abbaszadeh, Clifton Park, NY (US); Lalit Keshav Mestha, North Colonie, NY (US); Justin Varkey John, Niskayuna, NY (US); Cody Bushy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 15/497,974

(22) Filed: Apr. 26, 2017

(65) Prior Publication Data

US 2018/0316701 A1 Nov. 1, 2018

(51) Int. Cl.
*H04L 29/06* (2006.01)

(52) U.S. Cl.
CPC ...... *H04L 63/1425* (2013.01); *H04L 63/1433* (2013.01); *H04L 63/1416* (2013.01)

(58) Field of Classification Search
CPC . H04L 63/14; H04L 63/1408; H04L 63/1416; H04L 63/1425; H04L 63/1433;
(Continued)

(56) References Cited

U.S. PATENT DOCUMENTS

| 6,952,680 B1 | 10/2005 | Melby et al. |
| 9,426,169 B2 | 8/2016 | Zandani |

(Continued)

FOREIGN PATENT DOCUMENTS

| WO | 2016118979 A2 | 7/2016 |
| WO | 2016139097 A1 | 9/2016 |

OTHER PUBLICATIONS

Liu, Shan et al., "A Framework for Modeling Cyber-Physical Switching Attacks in Smart Grid", IEEE Transactions on Emerging Topics in Computing, vol. 1, Issue 2, Dec. 2013, (pp. 273-285, 13 total pages).

(Continued)

*Primary Examiner* — Jung W Kim
*Assistant Examiner* — Adrian Stoica
(74) *Attorney, Agent, or Firm* — Buckley, Maschoff & Talwalkar, LLC

(57) ABSTRACT

A system to protect a fleet of industrial assets may include a communication port to exchange information with a plurality of remote industrial assets. An industrial fleet protection system may receive information from the plurality of remote industrial assets or a cloud-based security platform and calculate, based on information received from multiple industrial assets, a current fleet-wide operation feature vector. The industrial fleet protection system may then compare the current fleet-wide operation feature vector with a fleet-wide decision boundary (e.g., separating normal from abnormal operation of the industrial fleet). The system may then automatically transmit a response (e.g., a cyber-attack threat alert or an adjustment to a decision boundary of an industrial asset) when a result of the comparison indicates abnormal operation of the industrial fleet.

20 Claims, 18 Drawing Sheets

(58) Field of Classification Search
CPC ..... H04L 63/1441; H04L 63/20; G06F 21/50; G06F 21/57; G06F 21/577; G06Q 10/06; G06Q 10/063; G06Q 10/0635
See application file for complete search history.

(56) References Cited

U.S. PATENT DOCUMENTS

| | | | | |
|---|---|---|---|---|
| 2010/0332475 | A1* | 12/2010 | Birdwell | G06F 17/30333 707/737 |
| 2011/0039237 | A1 | 2/2011 | Skare | |
| 2012/0284790 | A1* | 11/2012 | Bhargava | G06F 11/3612 726/22 |
| 2013/0274941 | A1* | 10/2013 | Khozikov | H04L 63/1416 700/292 |
| 2014/0130033 | A1 | 5/2014 | Alls et al. | |
| 2014/0283047 | A1* | 9/2014 | Dixit | G06F 21/55 726/23 |
| 2014/0289852 | A1 | 9/2014 | Evans et al. | |
| 2014/0337086 | A1* | 11/2014 | Asenjo | G06Q 10/0635 705/7.28 |
| 2016/0014159 | A1* | 1/2016 | Schrecker | H04L 63/0869 726/1 |
| 2016/0050225 | A1 | 2/2016 | Carpenter et al. | |
| 2016/0330225 | A1* | 11/2016 | Kroyzer | G06F 21/552 |
| 2018/0091540 | A1* | 3/2018 | Solow | H04L 63/1433 |

OTHER PUBLICATIONS

"Examining the Industrial Control System Cyber Risk Gap", Deloitte Development LLC, https://www2.deloitte.com/content/dam/Deloitte/us/Documents/risk/us-aers-ics-white-paper.pdf, 2015, (pp. 1-12, 12 total pages).

"Industrial Cyber Security Risk Manager", Honeywell International Inc, https://www.honeywellprocess.com/library/marketing/brochures/Cyber_Security_Risk_Manager_Brochure.pdf, 2016, (pp. 1-8, 8 total pages).

Kohli, Shruti "Developing Cyber Security Asset Management framework for UK Rail", International Conference on Cyber Situational Awareness, Data Analytics and Assessment (CyberSA), Jun. 13-14, 2016, 6pgs.

\* cited by examiner

| INDUSTRIAL ASSET IDENTIFIER 1502 | FLEET IDENTIFIER 1504 | DESCRIPTION 1506 | GLOBAL FEATURE FOR ASSET 1508 | ALERT SIGNAL 1510 | DECISION BOUNDARY FOR ASSET 1512 |
|---|---|---|---|---|---|
| IA_101 | F_1001 | POWER PLANT 1 | | NONE | |
| IA_102 | F_1001 | POWER PLANT 2 | | ALERT | |
| IA_103 | F_1001 | POWER PLANT 3 | | WARNING | |
| IA_104 | F_1002 | GAS TURBINE 1 | | NONE | OVER-RIDDEN |

*FIG. 15*

| ALERT IDENTIFIER 1702 | DESCRIPTION 1704 | INDUSTRIAL ASSET IDENTIFIER 1706 | FLEET IDENTIFIER 1708 | DATE(TIME) 1710 |
|---|---|---|---|---|
| A_101 | FLEET-WIDE ATTACK ALERT | N/A | F_101 | 06/06/2019 (14:32:06) |
| A_102 | GAS TURBINE WARNING | IA_104 | F_102 | 06/08/2019 (20:12:42) |
| A_103 | POWER PLANT 2 ALERT | IA_102 | F_101 | 06/12/2019 (04:25:53) |
| A_104 | FLEET-WIDE ATTACK ALERT | N/A | F_101 | 06/15/2019 (11:45:42) |

THREAT DETECTION FOR A FLEET OF INDUSTRIAL ASSETS

BACKGROUND

Industrial assets control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of an industrial asset and may cause a total shutdown or even catastrophic damage to a plant. Currently, Fault Detection Isolation and Accommodation ("FDIA") approaches only analyze sensor data, but a threat might occur even in other types of threat monitoring nodes such as actuators, control logical(s), etc. Also, note that FDIA is limited only to naturally occurring faults in one sensor at a time. FDIA systems do not address multiple simultaneously occurring faults, since those abnormalities are normally due to malicious intent. Moreover, in some cases an entire fleet of industrial assets may need to be monitored and/or protected. For example, a fleet of five geographically remote power plants might need to be monitored and, in some cases, information determined with respect to one power plant might be relevant to the protection of another power plant (e.g., the two plants might be undergoing similar attacks). It can be difficult, however, to simultaneously monitor many different industrial assets (e.g., each containing many different sensors and other sources of data) in substantially real time. It would therefore be desirable to facilitate the creation of a suitable threat detection system to protect a fleet of industrial assets from cyber threats in an automatic and accurate manner.

SUMMARY

According to some embodiments, a system to protect a fleet of industrial assets may include a communication port to exchange information with a plurality of remote industrial assets. An industrial fleet protection system may receive information from the plurality of remote industrial assets or a cloud-based security platform and calculate, based on information received from multiple industrial assets, a current fleet-wide operation feature vector. The industrial fleet protection system may then compare the current fleet-wide operation feature vector with a fleet-wide decision boundary (e.g., separating normal from abnormal operation of the industrial fleet). The system may then automatically transmit a response (e.g., a cyber-attack threat alert or an adjustment to a decision boundary of an industrial asset) when a result of the comparison indicates abnormal operation of the industrial fleet.

Some embodiments may comprise: means for receiving information from a plurality of remote industrial assets; means for calculating, based on information received from multiple industrial assets, a current fleet-wide operation feature vector; means for comparing the current fleet-wide operation feature vector with a fleet-wide decision boundary, the fleet-wide decision boundary separating normal operation of the industrial fleet from abnormal operation of the industrial fleet; means for automatically transmitting a response when a result of the comparison indicates abnormal operation of the industrial fleet.

Other embodiments may comprise: means for receiving a series of normal monitoring node values and generating a set of normal feature vectors; means for receiving a series of abnormal monitoring node values and generating a set of abnormal state feature vectors; means for automatically calculating a decision boundary for an abnormal state detection model based on the set of normal feature vectors and the set of abnormal feature vectors, the decision boundary separating normal operation of the industrial asset from abnormal operation of the industrial asset; and means for automatically adjusting the decision boundary based on information received from a remote industrial fleet protection system.

Still other embodiments may comprise: means for receiving streams of monitoring node signal values; for each stream of monitoring node signal values, means for generating a current monitoring node feature vector; means for selecting an appropriate decision boundary for each monitoring node, the appropriate decision boundary separating a normal state from an abnormal state for that monitoring node; means for comparing each generated current monitoring node feature vector with the selected corresponding appropriate decision boundary; and means for automatically transmitting information to the industrial fleet protection system based on results of said comparisons.

Yet other embodiments may comprise: means for receiving, at a cloud-based industrial fleet protection system, information from a plurality of remote industrial assets; means for calculating, based on information received from multiple industrial assets, a current fleet-wide operation feature vector; means for comparing the current fleet-wide operation feature vector with a fleet-wide decision boundary, the fleet-wide decision boundary separating normal operation of the industrial fleet from abnormal operation of the industrial fleet; and means for automatically transmitting a response when a result of the comparison indicates abnormal operation of the industrial fleet.

Some technical advantages of some embodiments disclosed herein are improved systems and methods to facilitate the creation of a suitable threat detection system to protect a fleet of industrial assets from cyber threats in an automatic and accurate manner.

As used herein, the term "attack" or "abnormal state" might refer to a malicious activity that was intelligently designed as well as to situations that arise naturally, such as an equipment fault or failure.

BRIEF DESCRIPTION OF THE DRAWINGS

FIG. 15 is a tabular portion of an industrial asset database in accordance with some embodiments.

FIG. 17 is a tabular portion of an alert database according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Industrial control systems that operate physical systems are increasingly connected to the Internet. As a result, these control systems may be vulnerable to threats and, in some cases, multiple attacks may occur simultaneously. Existing approaches to protect industrial assets, such as FDIA approaches, may not adequately address these threats— especially when a substantial number of monitoring nodes of different types are evaluated and various performance metrics need to be considered. Moreover, cyber-attacks on industrial assets are a significant problem that may impact an entire fleet of assets (e.g., such as a fleet of power generation assets). One challenge may be to manage information at a local asset level (e.g., local power plant level) and provide fleet-wide monitoring to detect cyber-attacks. In some cases, IT and/or OT level processing may protect and detect attacks to industrial assets. Such protection, however, might fail when malware or other unauthorized software gets beyond this level of defense and enters into cyber-physical layer. Some embodiments described herein may provide a cyber-physical layer of defense (beyond the IT and OT layers) that processes plant sensor, actuator, and/or control node data to confirm that industrial assets are operating within a normal operation space. According to some embodiments, a cyber-physical detection algorithm may utilize digital modeling algorithms associated with the physics relationship between control nodes to determine a current asset and/or fleet attack status. For example, a fleet-wide attack analysis may be performed using a time-stamped asset risk index, global features and local (i.e., edge) signatures. Such an approach may then provide fleet level analytics along with alertness. Because it may be difficult to simultaneously assess fleet level alertness for many different assets during an attack, embodiments may rank the local assets (e.g., based on their importance to energy production and delivery, susceptibility to attacks, and/or a potential loss of power if asset operations continue in a current state).

Figure 1:
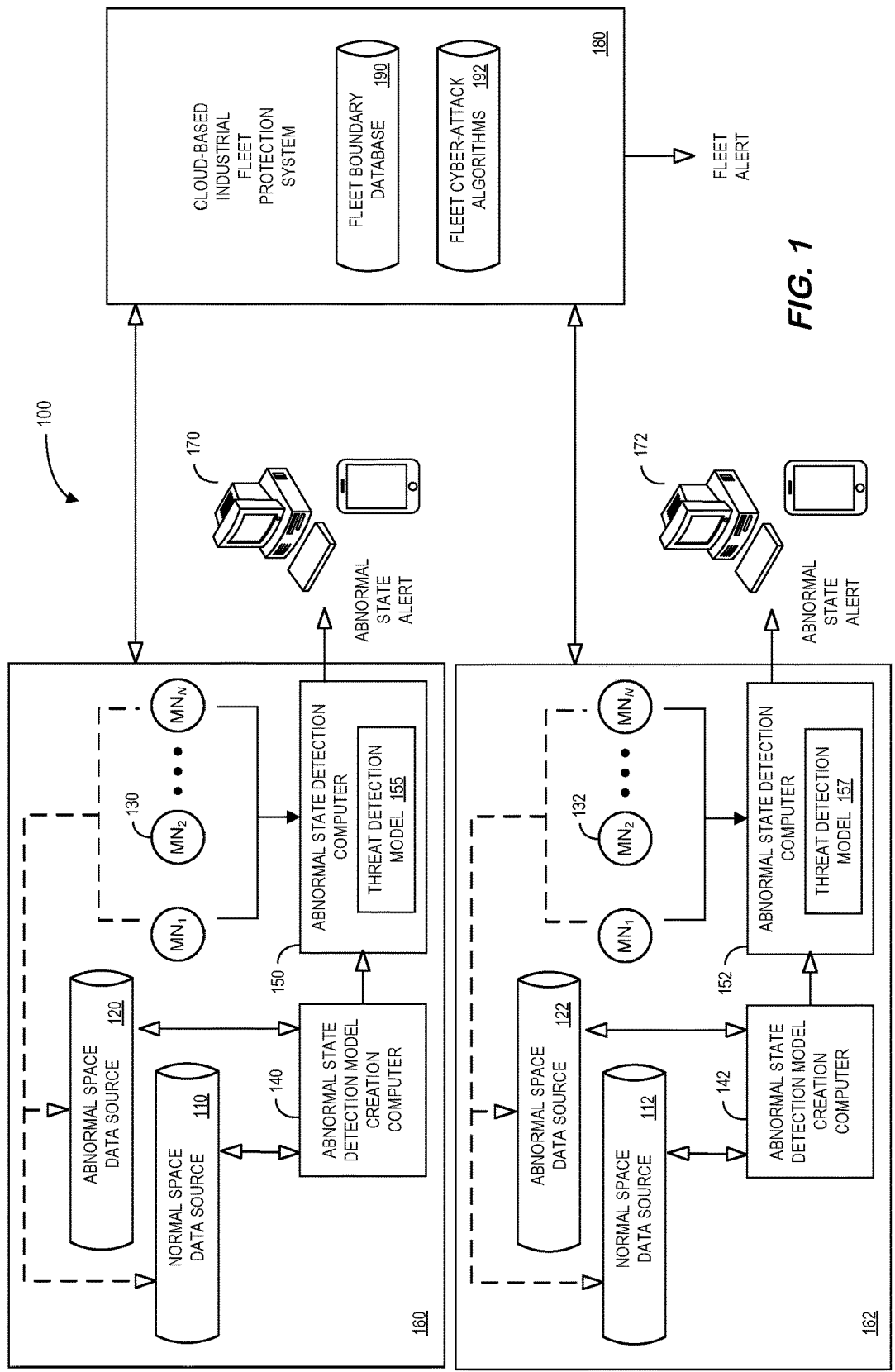
FIG. 1 is a high-level block diagram of a system that may be provided in accordance with some embodiments.

Some embodiments described herein may facilitate the creation of a suitable threat detection system to protect a fleet of industrial assets from cyber threats in an automatic and accurate manner. For example, FIG. 1 is a high-level architecture of a system 100 in accordance with some embodiments. The system 100 includes a cloud-based industrial fleet protection system 180 that monitors and protects two industrial assets 160, 162. The first industrial asset 160 may include a "normal space" data source 110 and an "abnormal space" data source 120. The normal space data source 110 might store, for each of a plurality of "monitoring nodes" 130, a series of normal values over time that represent normal operation of an industrial asset (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, monitoring nodes that receive data in a continuous fashion in the form of continuous signals or streams of data or combinations thereof. Moreover, the monitoring nodes 130 may be used to monitor occurrences of cyber-threats or abnormal events. This data path may be designated specifically with encryptions or other protection mechanisms so that the information may be secured and cannot be tampered with via cyber-attacks. The abnormal space data source 120 might store, for each of the monitoring nodes 130, a series of threatened values that represent a threatened operation of the industrial asset (e.g., when the system is experiencing a cyber-attack or equipment failure).

Information from the normal space data source 110 and the abnormal space data source 120 may be provided to abnormal state detection model creation computer 140 that uses this data to create a decision boundary (that is, a boundary that separates normal behavior from abnormal behavior). The decision boundary may then be used by an abnormal state detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), to calculate one or more "features" for each monitoring node based on the received data, and "automatically" output a threat alert signal to one or more remote monitoring devices 170 when appropriate (e.g., for display to an operator). According to some embodiments, a threat alert signal might be transmitted to a unit controller, a plant Human-Machine Interface ("HMI"), or to a customer via a number of different transmission methods. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. Moreover, term "automatically" may refer to, for example, actions that can be performed with little or no human intervention. According to some embodiments, information about a detected threat may be transmitted back to the industrial control system.

The first industrial asset 160 may also transmit information to the cloud-based industrial fleet protection system 180. This information might include, for example, monitoring node 130 data, decision boundaries, alert signals, etc. The cloud-based industrial fleet protection system 180 may receive similar data from the second industrial asset 162 (e.g., similar to the first industrial asset 160 and comprising a normal space data source 112, an abnormal space data source 122, monitoring nodes 132, an abnormal state detection model creation computer 142, an abnormal state detection computer 152, a threat detection model 157, and remote monitoring devices 172). As will be described, the cloud-based industrial fleet protection system 180 may utilize a fleet boundary database 190 and/or fleet cyber-attack algorithms 192 to monitor and protect the industrial assets 160, 162 (e.g., by generating a fleet alert signal).

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the abnormal space data source 120. The various data sources may be locally stored or reside remote from the threat detection model creation computer 140 (which might be associated with, for example, offline or online learning). Although a single threat detection model creation computer 140 is shown in FIG. 1 for each industrial asset 160, 162, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

An operator access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let an operator define and/or adjust certain parameters (e.g., threat detection trigger levels) and/or provide or receive automatically generated recommendations or results from the threat detection model creation computer 140 and/or threat detection computer 150. Similarly, an operator may perform any of these functions in connection with the cloud-based industrial fleet protection system 180.

Figure 2:
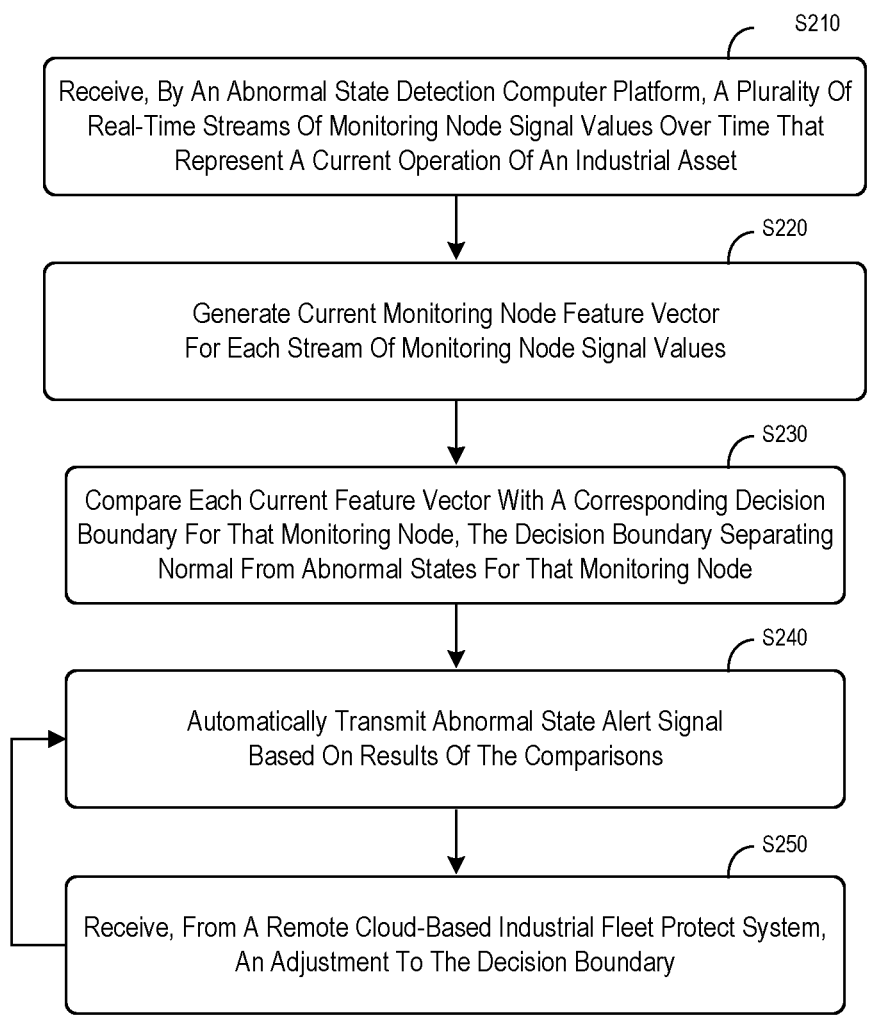
FIG. 2 is a method that might be performed by industrial assets according to some embodiments.

FIG. 2 illustrates a method that might be performed by some or all of the industrial assets 160, 162 in system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset. At least one of the monitoring nodes (e.g., controller nodes, etc.) may be associated with, for example, sensor data, an auxiliary equipment input signal, a control intermediary parameter, and/or a control logic value. At S220, an abnormal state detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset. Moreover, at least one decision boundary may exist in a multi-dimensional space and be associated with data generated from a dynamic model, design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically adapted based on a transient condition, a steady state model of the industrial asset, and/or data sets obtained while operating the system as in self-learning systems from incoming data stream.

At S240, the industrial asset may automatically transmit an abnormal state alert signal (e.g., a threat notification message, etc.) based on results of the comparisons performed at S230. The abnormal state might be associated with, for example, an actuator attack, a controller attack, a monitoring node attack, a plant state attack, spoofing, physical damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset (e.g., to let the detected potential cyber-attack be further investigated). According to some embodiments, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries. Moreover, according to some embodiments, some or all of this information might be transmitted to an industrial fleet protection system (e.g., that monitors a number of different industrial assets).

At S250, the industrial asset may automatically adjust a decision boundary based on information received from a remote industrial fleet protection system (and the process may continue at S240). For example, the industrial fleet protection system might "over-ride" the locally determined decision boundary with a different decision boundary (e.g., based on information learned from attacks on other industrial assets). Note that the industrial asset may also transmit information to the industrial fleet protection system. This information might include, for example, an abnormal state alert, an industrial asset feature vector, an industrial asset global feature vector, an industrial asset decision boundary, a series of monitoring node values, a cyber-attack risk probability, a per-asset risk index, and/or a real-time signature. Moreover, the information might be transmitted using a cloud-based system, an edge-based system, a wireless system, a wired system, a secured network, and/or any other communication system. Further note that the abnormal state alert signal transmitted at S240 might further be based on information received from the industrial fleet protection system (e.g., a potential attack type, a potential attack signature, potential attack time characteristics, an indication of a fleet-wide attack, an indication of an attack limited to a subset of the industrial assets, an indication that no attack is currently being detected, etc.).

Some embodiments described herein may take advantage of the physics of a machine by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the machine may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) and let an operator restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using monitoring node-specific decision boundaries and may inform a control system to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on monitoring node data, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
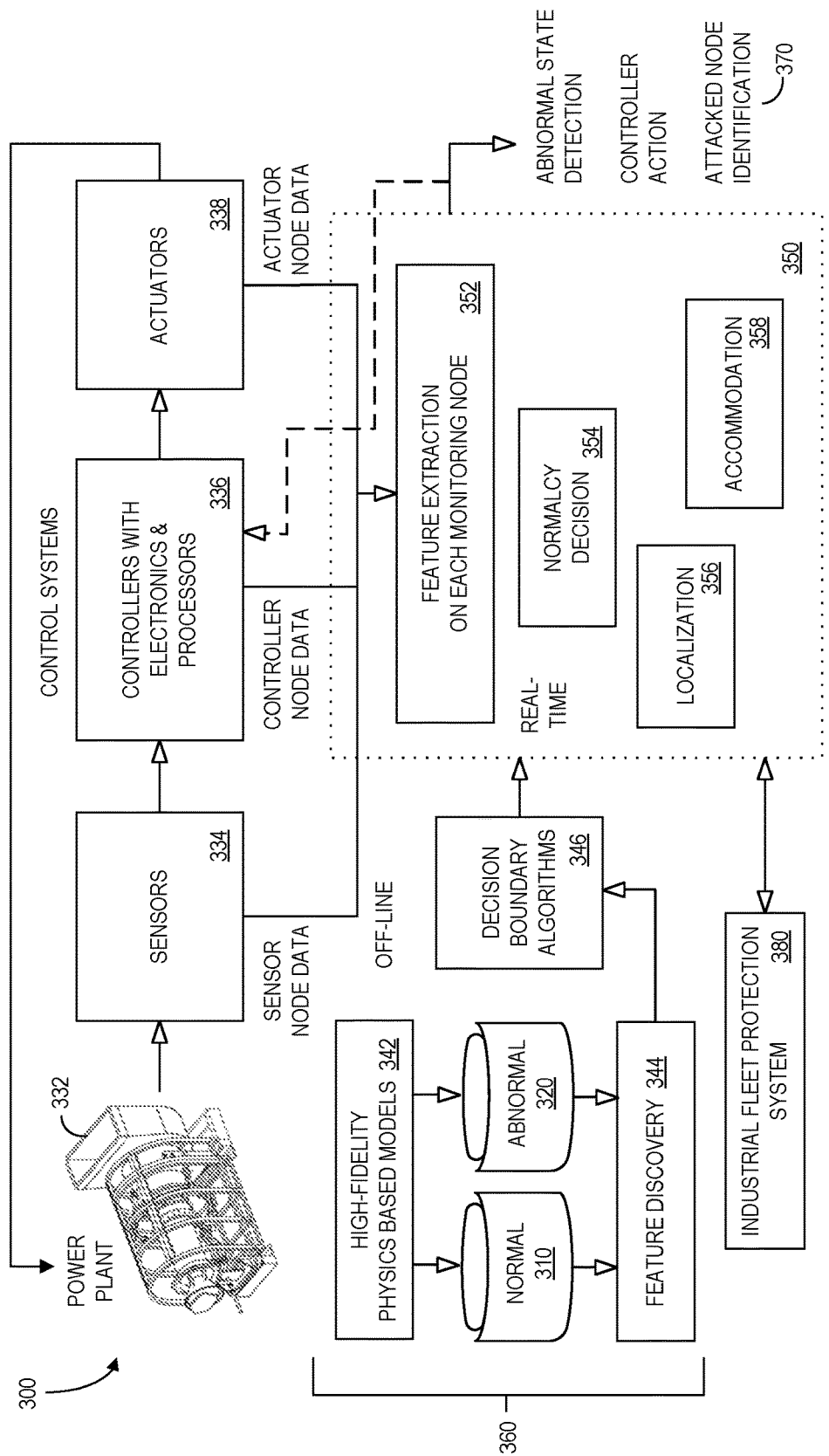
FIG. 3 is threat alert system in accordance with some embodiments.

A cyber-attack detection and localization algorithm may process a real-time turbine signal data stream and then compute features (multiple identifiers) which can then be compared to the sensor specific decision boundary. According to some embodiments, the detection and localization algorithm may receive information from (and/or provide information to) an industrial fleet protection system. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. An off-line threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes. The real-time threat detection platform 350 may further exchange information with an industrial fleet protection system 350. For example, the real-time threat detection platform 350 may receive information from the industrial fleet protection system 350 and use that information to over-ride or otherwise adjust decision boundaries. Similarly, the real-time threat detection platform 350 might transmit information to the industrial fleet protection system 380 (e.g., including feature vectors, alerts, monitoring node data, etc.).

During real-time detection, contiguous batches of monitoring node data may be processed by the platform 350, normalized and the feature vector extracted. The location of the vector for each signal in high-dimensional feature space may then be compared to a corresponding decision boundary (including a decision boundary dictated by the industrial fleet protection system). If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related to any of the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked. Some or all of this information might be transmitted to the industrial fleet protection system 380.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a control command signal to auxiliary equipment being attacked. The control intermediary parameters and control logical(s) may also be analyzed using similar methods. Note that an algorithm may rationalize signals that become anomalous. An attack on a signal may then be identified.

Figure 4:
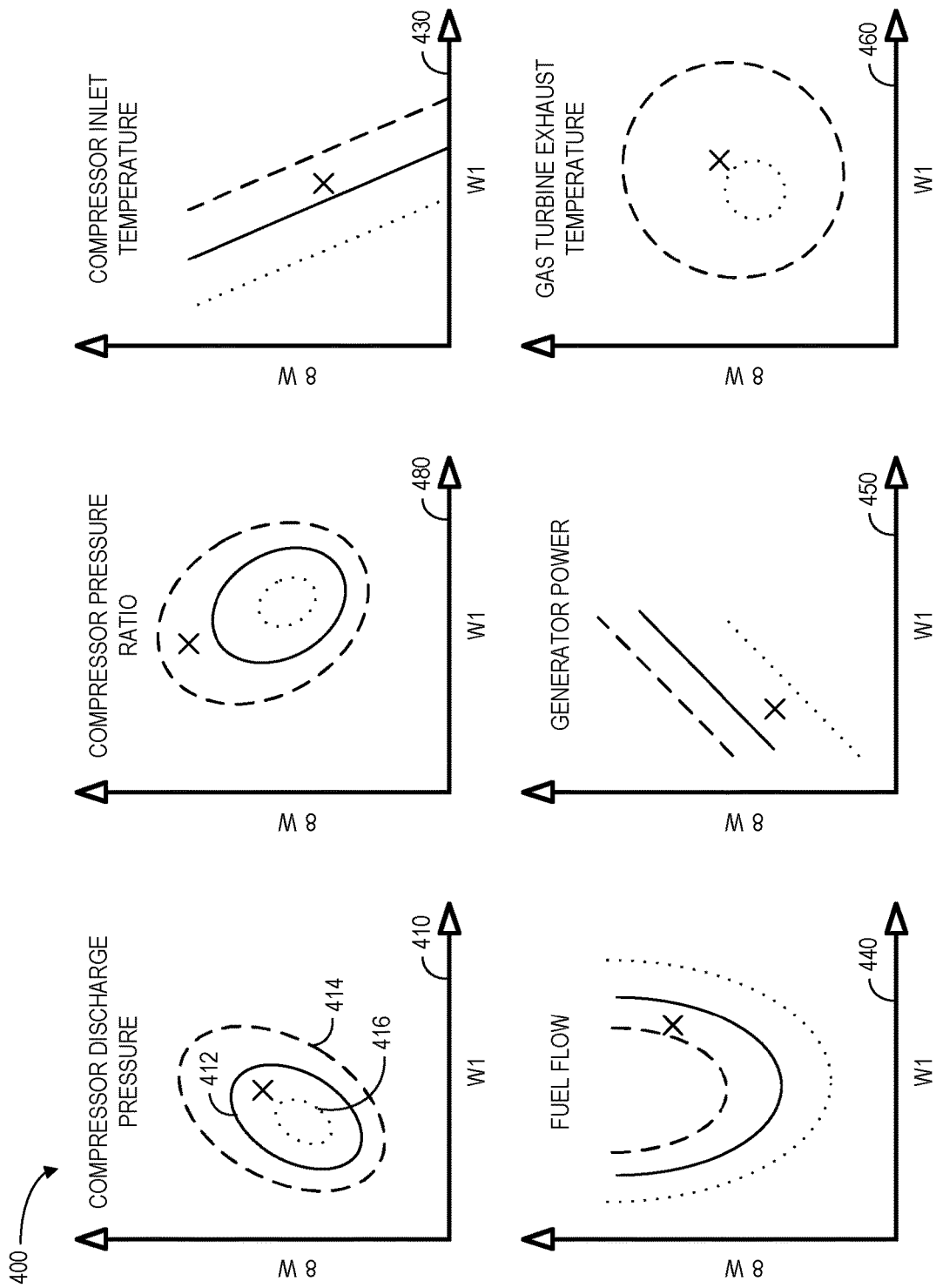
FIGS. 4 through 6 illustrate boundaries and feature vectors for various monitoring node parameters according to some embodiments.

FIG. 4 illustrates 400 boundaries and feature vectors for various monitoring node parameters at an industrial asset in accordance with some embodiments. In particular, for each parameter, a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 410, compressor pressure ratio 420, compressor inlet temperature 430, fuel flow 440, generator power 450, and gas turbine exhaust temperature 460. Each graph includes a hard boundary 412 (solid curve), minimum boundary 416 (dotted curve), and maximum boundary 414 (dashed curve) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset is normal (and no threat is being detected indicating that the system is currently under attack).

Figure 5:
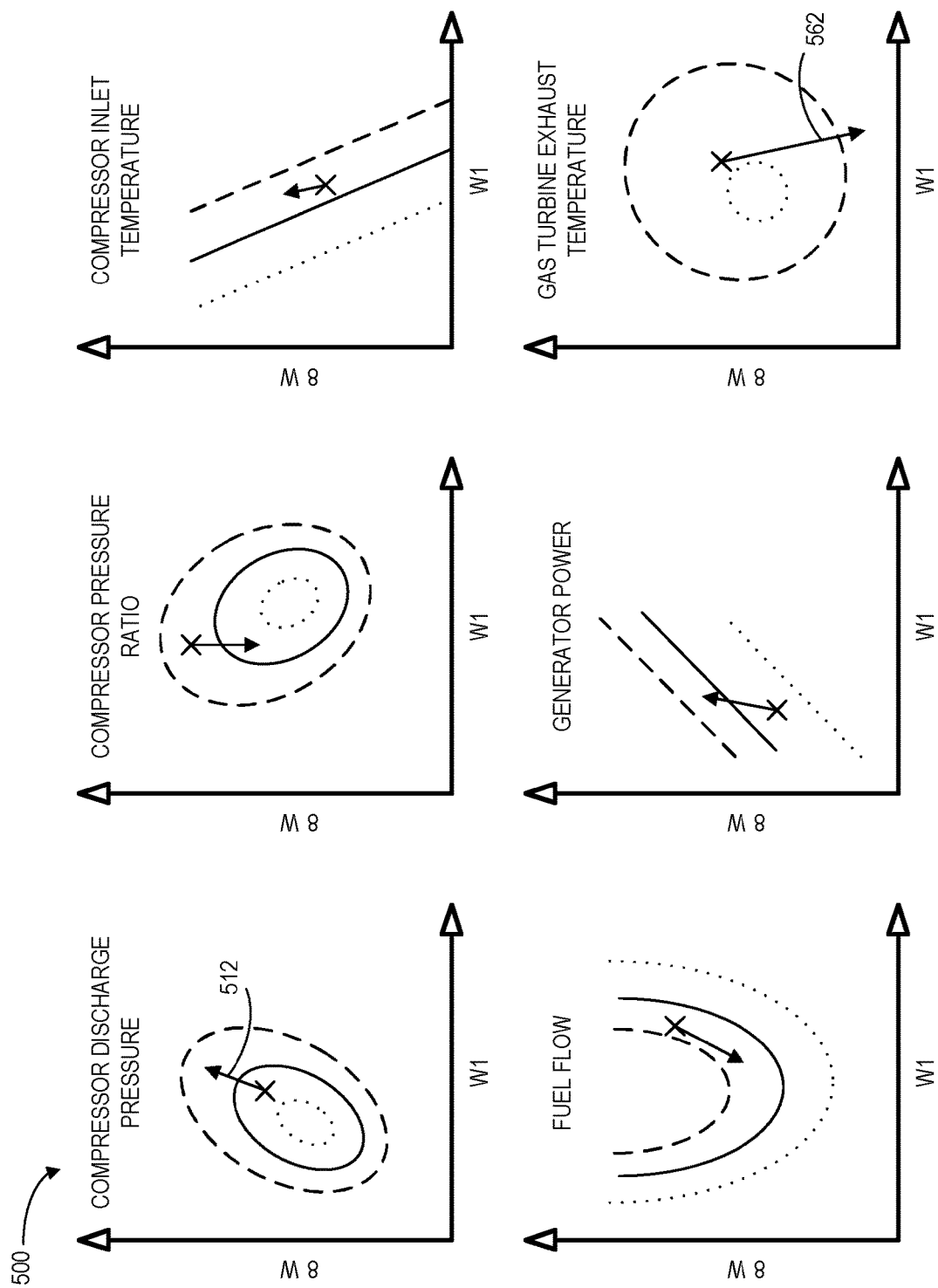
Figure 6:
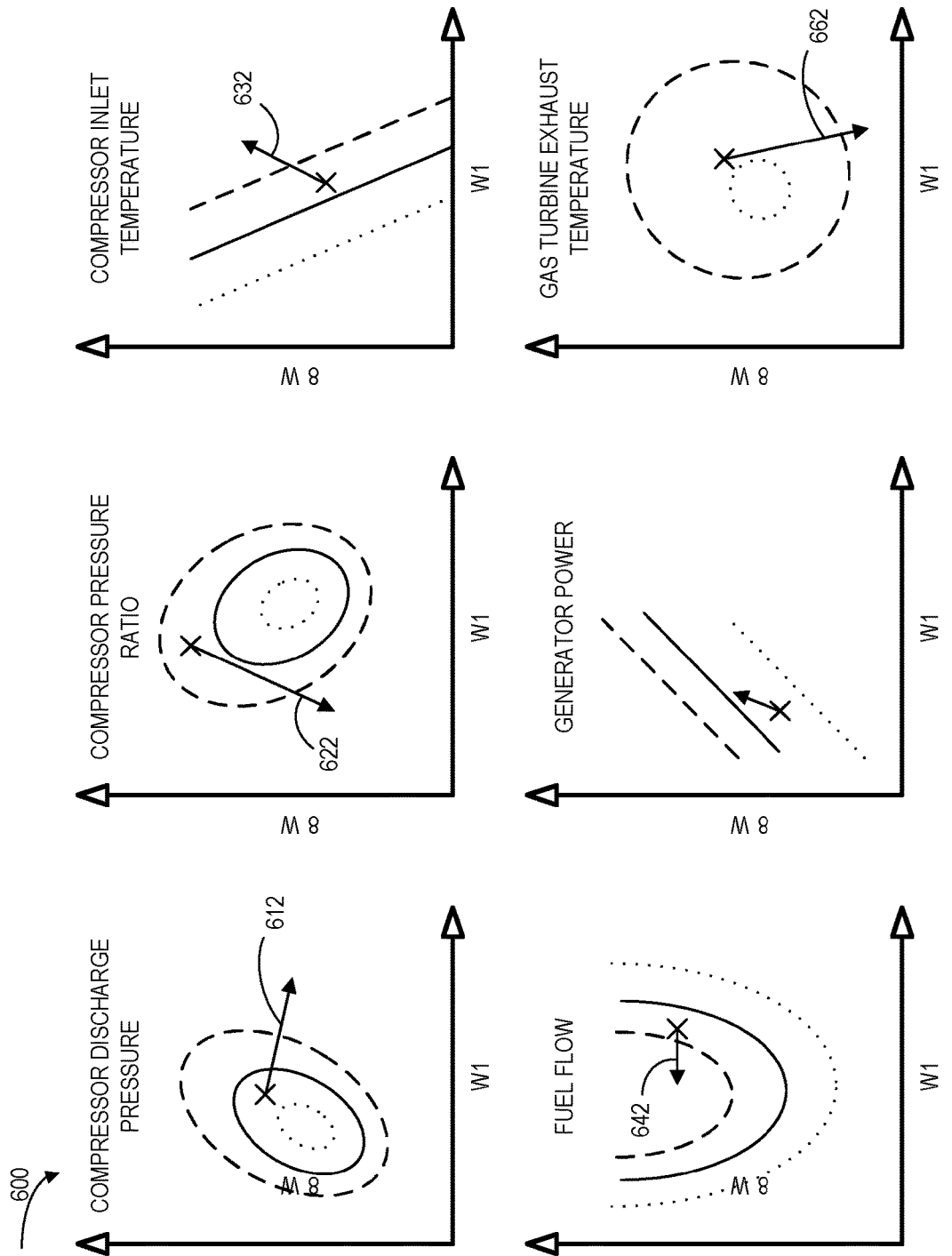

FIG. 5 illustrates 500 subsequent boundaries and feature vectors for these parameters at the industrial asset. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal at the industrial asset. In particular, feature movement for the compressor discharge pressure 612, compressor pressure ratio 622, compressor inlet temperature 632, and fuel flow 642 have all become abnormal (joining the feature vector for the gas turbine exhaust temperature 662). Note that the feature vector for generator power did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed. An alert signal might then be generated and/or transmitted to an industrial fleet protection system (e.g., a system that monitors many different industrial assets).

The cyber-attack detection and localization algorithms described herein can detect both abnormal signals of sensors and also signals sent to auxiliary equipment, control intermediary parameters and/or control logical(s). The algorithm may also understand multiple signal attacks at the industrial asset. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system might be utilized to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 7:
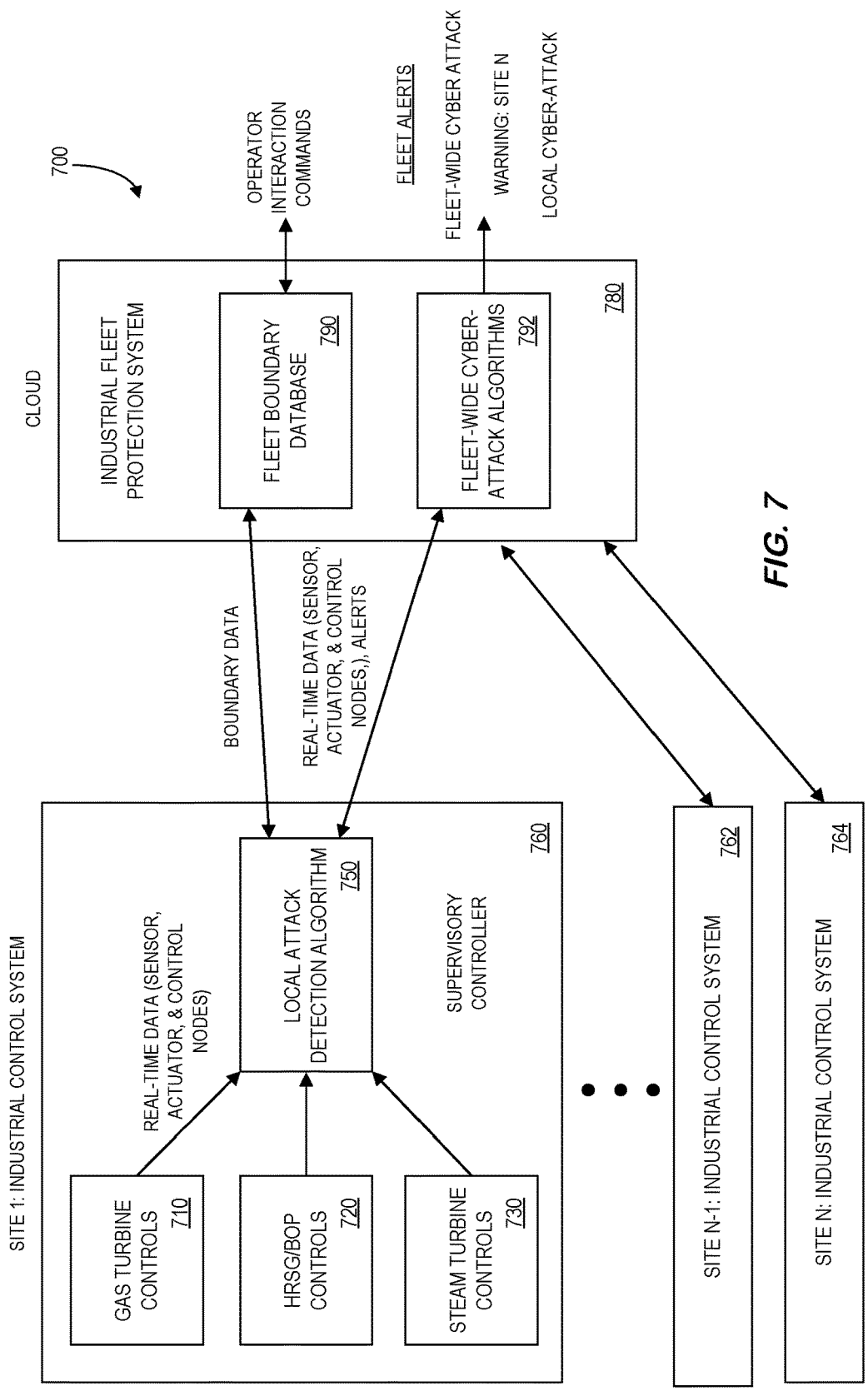
FIG. 7 is a system architecture of local and cloud processing in accordance with some embodiments.

Moreover, according to some embodiments, information received from a remote, cloud-based industrial fleet protection system might be used to modify these decision boundaries. For example, FIG. 7 is a system architecture 700 of local and cloud processing in accordance with some embodiments. The local processing is performed by industrial control systems at various sites 760, 762, 764 (e.g., sites 1 through N as illustrated in FIG. 7). The cloud processing is performed by an industrial fleet protection system 780 that includes a fleet boundary database 790 and fleet-wide cyber-attack algorithms 792.

The first industrial control system 760 (at site 1) includes gas turbine controls 710, Heat Recovery Steam Generator ("HRSG") and Balance-Of-Plant Controls ("BOP"), and steam turbine controls 730. As used herein, the term BOP might refer to, for example, supporting power engineering components and auxiliary systems of a power plant needed to deliver energy. The controls 710, 720, 730 transmit real-time data (e.g., associated with sensor and/or actuator control nodes) to a local attack detection algorithm 750 (that is, local to site 1). The local attack detection algorithm 750 may then exchange boundary data with the fleet boundary database 790 and/or real-time data and associated alerts with the fleet-wide cyber-attack algorithms 792. The other industrial control systems 762, 762 may gather and exchange information in a similar fashion. Based on the information received from the industrial control systems 760, 762, 764, the fleet boundary database 790 might update locally determined boundaries (e.g., in some cases based on operator interaction commands). The fleet-wide cyber-attack algorithms 792 might use data from the industrial control systems 760, 762, 764 to generate fleet alerts, such as fleet-wide cyber-attack alerts, warnings (e.g., at one or more particular sites), and/or local alerts (e.g., even when a local site itself did not recognize an attack).

According to some embodiments, a local agent (e.g., edge-based at an industrial control system 760, 762, 764) may make a calculation associated with a cyber-attack probability and risk index per asset. The asset risk index, global features, and local signatures vs time may be used to create a local, real-time signature of each asset. This signature may be broadcast to the industrial fleet protection system 780 and be compared to other fingerprint signatures. The analysis at the fleet level may allow the industrial fleet protection system 780 to determine if there is a fleet-wide attack.

In the case of a fleet-wide attack, the cloud-based industrial fleet protection system 780 can alert all of the assets about the potential attack type, signature, time characteristics, etc. and update decision boundaries in accordance with adjustments made at the fleet level. One benefit of leveraging data from fleet-wide attacks to alter/update decision boundaries at other units is that "zero day" (or near "zero day") cyber-attacks will be localized and contained. Although the illustration of FIG. 7 is associated with power plants, note that embodiments might instead be associated with aviation engines, ship propulsion systems, locomotive engines, dams, elements of a power grid, or any other type of cyber-physical control system with actuators and sensors.

Figure 8:
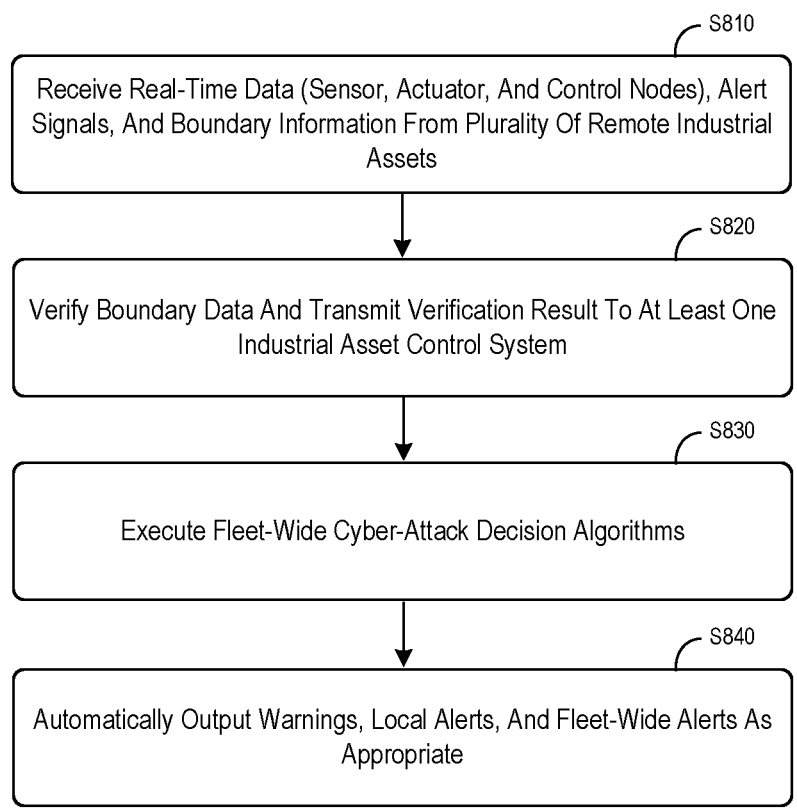
FIG. 8 is a method for performing fleet-wide protection according to some embodiments.

FIG. 8 is a method for performing fleet-wide protection according to some embodiments. At S810, real-time sensor data (e.g., associated with sensor, actuator, and/or control nodes) is received from a plurality of remote industrial assets along with alert signals and boundary information. At S820, boundary data may be verified and a verification result may be transmitted to at least one of the industrial assets (e.g., and, in some cases, the verification result might over-ride a locally determined boundary based on information from other industrial assets). Fleet-wide cyber-attack decision algorithms may then be executed at S830, and warnings, local alerts, fleet-wide alerts, etc. may be output as appropriate at S840.

Figure 9:
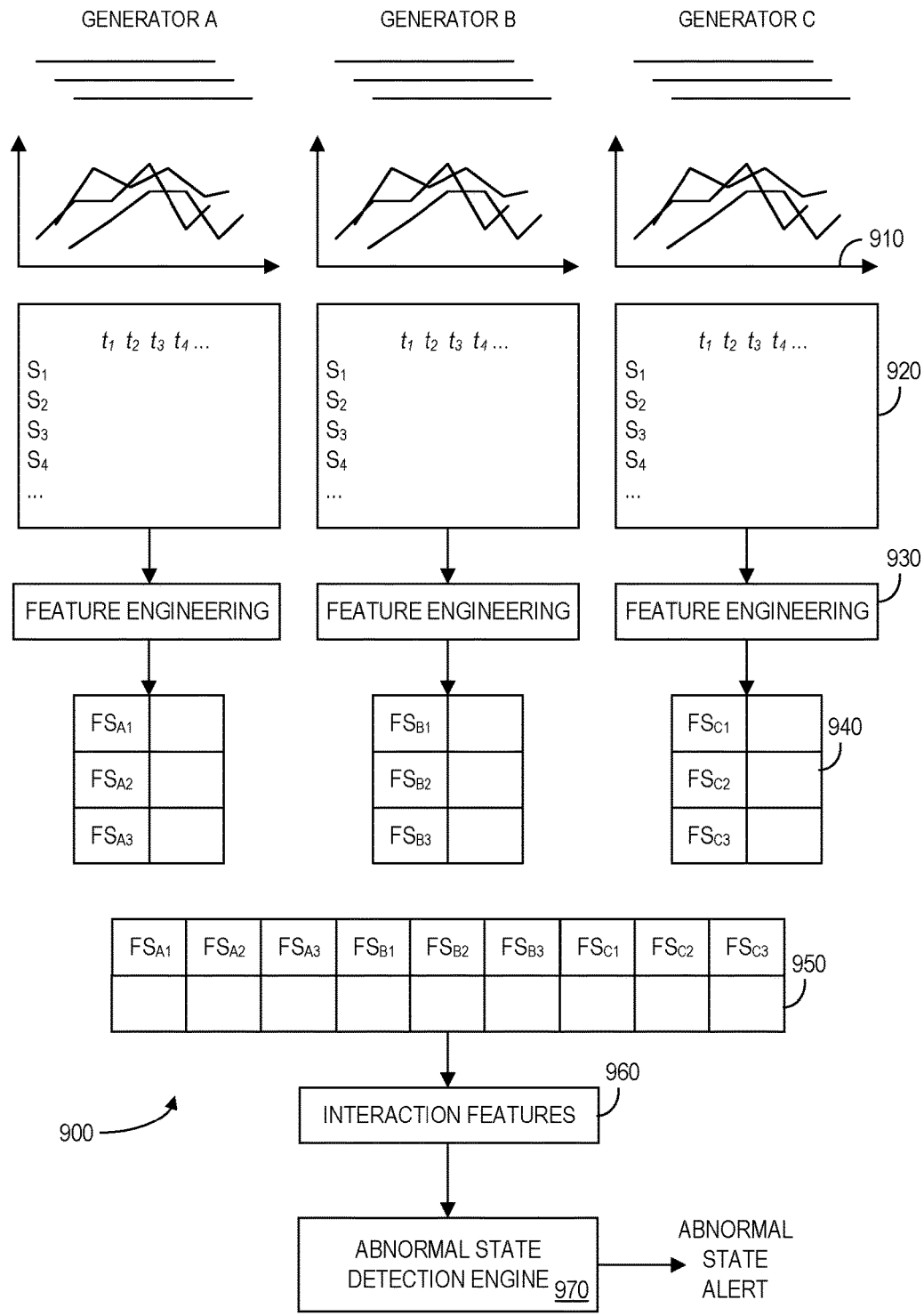
FIG. 9 is an example of a global threat protection system in accordance with some embodiments.

According to some embodiments, the fleet-wide cyber-attack algorithms might receive locally computed features (computed at the edge level) at the cloud for comprehensive fleet-wide analysis. The fleet processing in the cloud might, for example, confirm or reject the local edge decision based on high speed data transmitted to the cloud. According to some embodiments, "global" features at an industrial asset might also be analyzed (in additional to local features). For example, FIG. 9 is an example 900 including a global feature vector that might be determined at an industrial asset in accordance with some embodiments. In particular, asset includes three generators (A, B, and C) and batches of values 910 from threat nodes are collected for each generated over a period of time (e.g., 30 to 50 seconds). According to some embodiments, the batches of values 910 from threat nodes overlap in time. The values 910 from threat nodes may, for example, be stored in a matrix 920 arranged by time ($t_1$, $t_2$, etc.) and by type of threat node ($S_1$, $S_2$, etc.). Feature engineering components 930 may use information in each matrix 920 to create a feature vector 940 for each of the three generators (e.g., the feature vector 940 for generator C might include $FS_{C1}$, $FS_{C2}$, etc.). The three feature vectors 940 may then be combined into a single global feature vector 950 for the system 900. Interaction features 960 may be applied (e.g., associated with A*B*C, A+B+C, etc.) and an anomaly detection engine 970 may compare the result with a decision boundary and output a threat alert signal when appropriate. As will be described, embodiments may transmit the local feature vectors 940 and/or the global feature vector 950 to a remote industrial fleet protection system.

Figure 10:
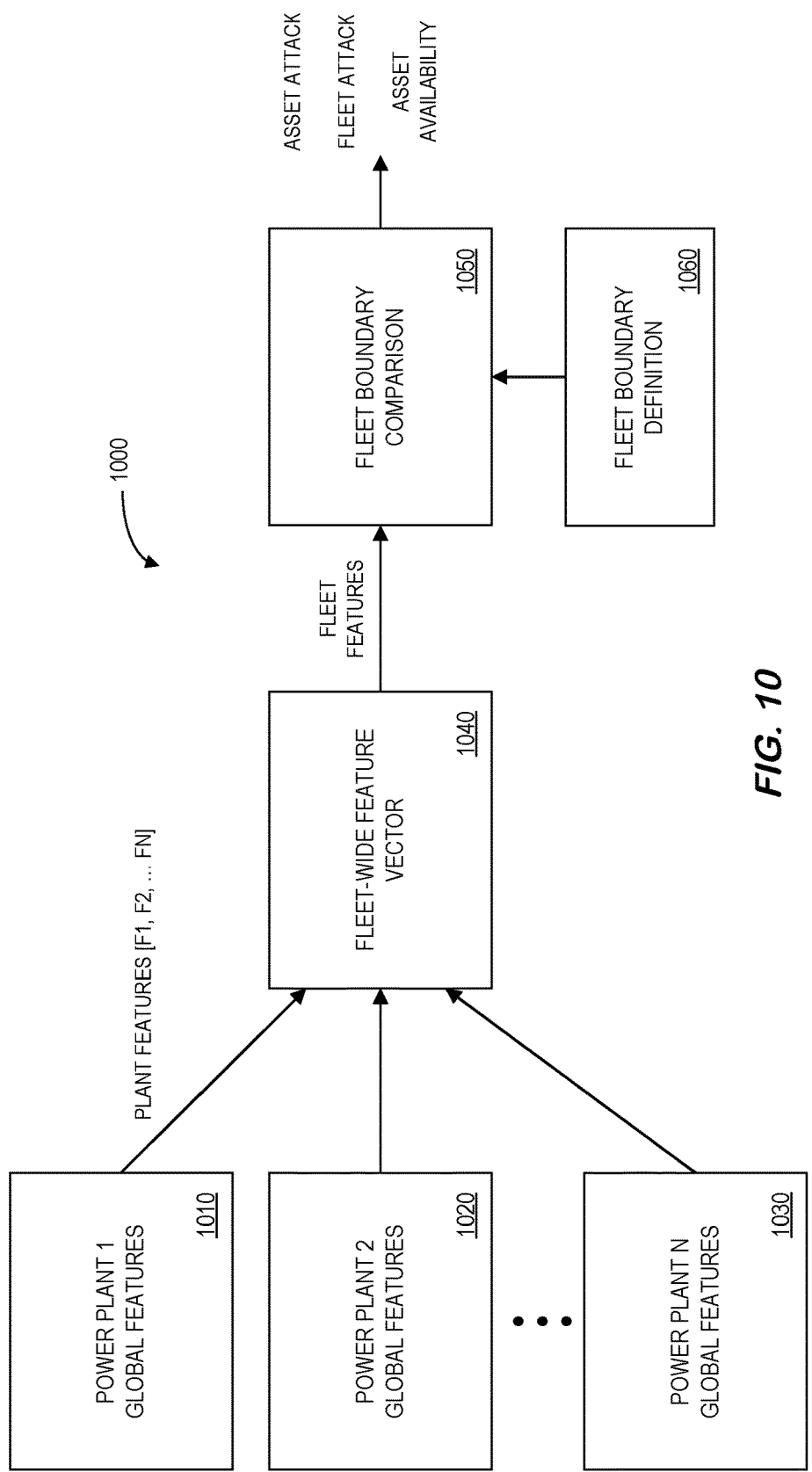
FIG. 10 shows local power plant features being combined into a fleet-wide feature vector according to some embodiments.

FIG. 10 shows 1000 local power plant features being combined into a fleet-wide feature vector according to some embodiments. In particular, global plant features ("[F1, F2, . . . , FN]") from three different power plants 1010, 1020, 1030 are combined into a single fleet-wide feature vector 1040. This fleet-wide feature vector 1040 can be used by a fleet boundary comparison 1050 (in accordance with a fleet boundary definition 1060) to generate an asset attack signal, a fleet attack signal, an asset availability signal (e.g., indicating a prediction of future availability based on degradation, etc.). Note that some features might be correlated across local power plants, such as generator features, power factor, voltage, current, generator speed, etc. As a result, dimensionality reduction techniques may be applied to reduce number of fleet level features when correlated features are included in the feature vector. This state may then be compared to one or more fleet-wide boundaries to determine if a fleet attack has occurred. The fleet/cloud algorithm may validate the decision from each local power plant 1010, 1020, 1030. This check may, for example, act as a second line of decision for the algorithm at the fleet-level.

Figure 11:
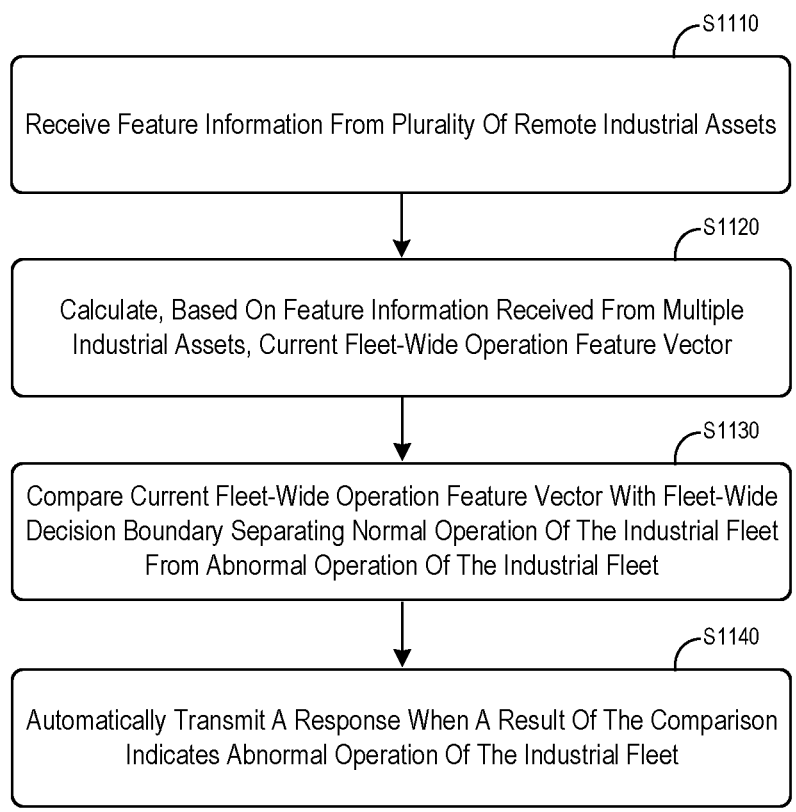
FIG. 11 is a method of utilizing a fleet-wide feature vector in accordance with some embodiments.

FIG. 11 is a method of utilizing a fleet-wide feature vector in accordance with some embodiments. At S1110, information may be received from a plurality of remote industrial assets. The received information might include, for example, an abnormal state alert, an industrial asset feature vector, an industrial asset global feature vector, an industrial asset decision boundary, a series of monitoring node values, a cyber-attack risk probability, a per-asset risk index, a real-time signature, etc.

At S1120, a current fleet-wide operation feature vector may be calculated based on information received from multiple industrial assets. According to some embodiments, the calculation of the current fleet-wide operation feature vector is facilitated via dimensionality reduction techniques. For example, the plurality of industrial assets might be associated with power plants and the dimensionality reduction techniques are applied to correlated features across power plants, such as generator features, power factors, voltages, current, and generator speed. At S1130, the current fleet-wide operation feature vector may be compared with a fleet-wide decision boundary separating normal operation of the industrial fleet from abnormal operation (e.g., a cyber-attack, a threat warning, a predicted cyber-attack, equipment failure, etc.) of the industrial fleet.

At S1140, a response may be automatically transmitted when a result of the comparison indicates abnormal operation of the industrial fleet. According to some embodiments, an abnormal state alert is received from a first industrial asset and the automatic response is transmitted to a second industrial asset (that is, a different industrial asset instead of the one that originally generated by the alert). The automatic respond might include, for example, transmitting, from the industrial fleet protection system to at least one of the industrial assets, an adjustment to an industrial asset decision boundary. Other information that might be used in the response includes, for example, a potential attack type, a potential attack signature, potential attack time characteristics, an indication of a fleet-wide attack, an indication of an attack limited to a subset of the industrial assets, an indication that no attack is currently being detected, etc.

According to some embodiments, the industrial fleet protection system may also predict asset availability, perform a severity analysis, execute an accommodation process, and/or confirm an abnormal state alert received from an industrial asset. Note that when the detected abnormal operation is associated with a cyber-attack, the industrial fleet protection system might detect the cyber-attack even when none of the industrial assets detect a cyber-attack.

Figure 12:
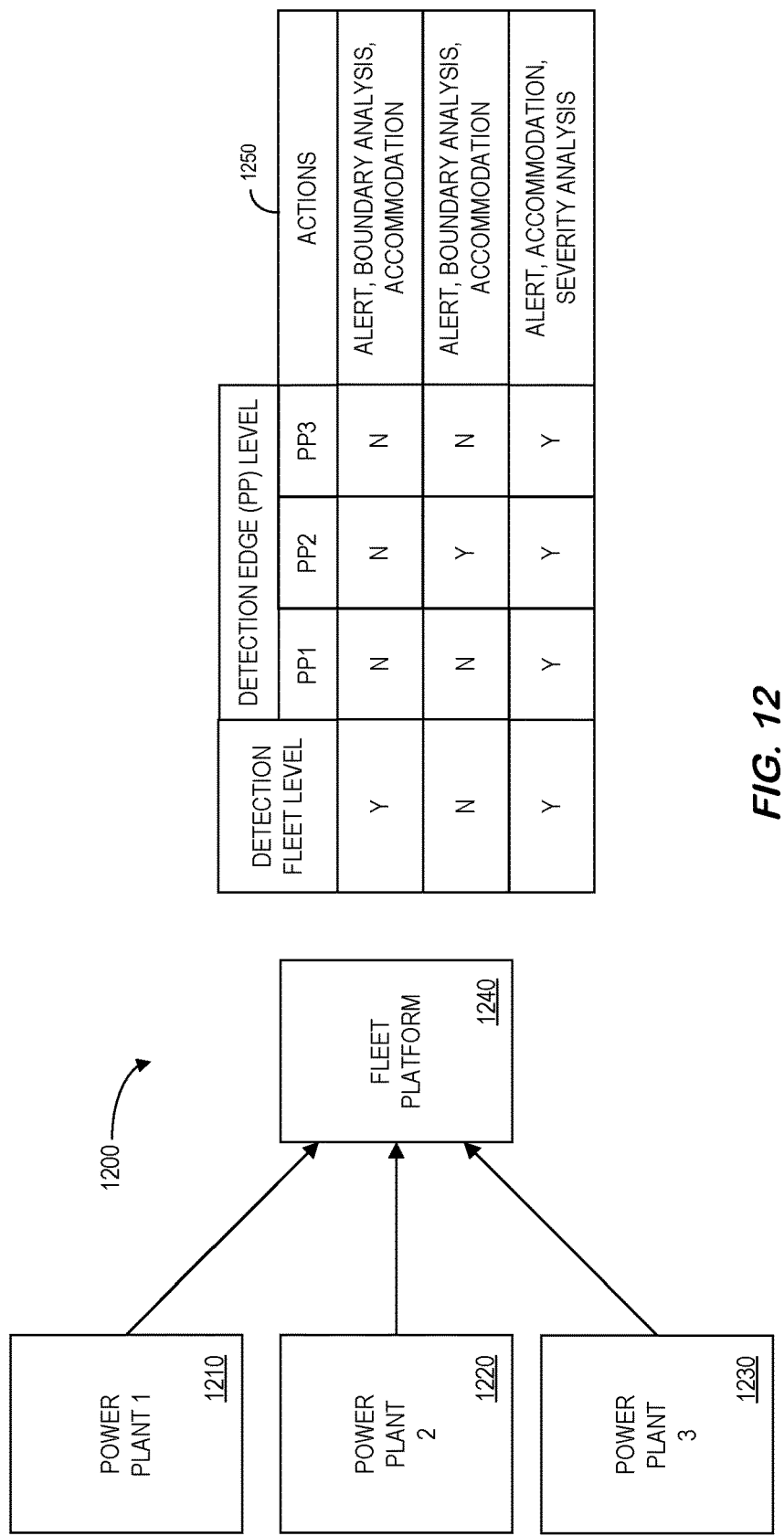
FIG. 12 illustrates fleet and edge threat detection scenarios according to some embodiments.

FIG. 12 illustrates 1200 fleet and edge threat detection scenarios 1250 according to some embodiments. In this illustration 1200, three power plants 1210, 1220, 1230 exchange information with a fleet platform 1240. The scenarios 1250 include attack detection at both fleet level and the edge or power plant level (PP1 through PP3), with a "Y" indicating that an attack is detected and a "N" indicating that no attack is detected. Note that there may be several different actions that could be taken when the attacks are detected. In the first scenario 1250, none of the edge level attack detection algorithms detect any attacks, but the fleet level algorithms do detect an attack. As a result, there may be confusion and further analysis may be performed on each plant level feature (to see how close the vector is to a decision boundary). For example, one power plant 1210 features may be operating very close to the decision boundary, and the other two power plants 1220, 1230 may have features that are farther away from the boundary. Hence, the global fleet level decision may "Y." In that case, the fleet level decision might be taken seriously so that operations in first power plant 1210 are investigated. This is because operating the first power plant 1210 close to the decision boundary may mean there is a possibility of stealthy attack in progress and the system may be expected to go beyond operational limits if left unattended. Note that such decisions might be made after confirming information about fleet-level decisions.

In the second scenario 1250, one of the edge decisions is "Y" (for the second power plant 1220) while the fleet-wide decision is "N." In this case, it may be useful to check how far the local features are with respect to the site-specific decision boundary. These situations might occur, for example, when local feature vectors are very close to the decision boundary. An appropriate decision can be made to take, for example, one of three actions: (1) update the decision boundary for that site via boundary adaptation techniques, (2) check for anomalies in the sensing system identified by the automatic localization algorithm to mitigate anomalies and continue to operate the system, or (3) enable an accommodation loop to continue to operate while the identified sensing system undergoes further examination.

In the third scenario 1250, fleet detection and edge detection are both "Y." As a result, an alert may be generated and accommodation might be enabled for all power plants 1210, 1220, 1230. According to some embodiments, boundary analysis with historical data of localization analytics may be used to help assess the severity of the attack. Note that accommodation alone might not provide safe operation depending on the severity of the attack. That is, a plant-wide and/or fleet-wide shut down might be required. Depending on the plant load dispatch condition (demand response versus dispatch response), the algorithm might make a forecast to predict when a power producing asset might be brought offline. Moreover, an Independent System Operator ("ISO") might make predictive contingency responses based on the fleet attack information.

Figure 13:
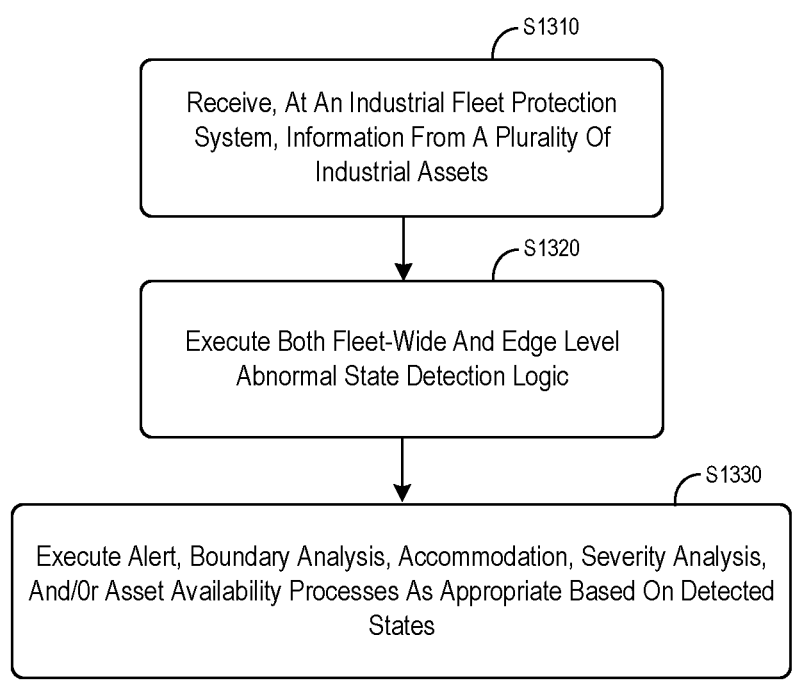
FIG. 13 is a method or performing fleet-wide protection in accordance with some embodiments.

Note that there are several different actions that might be taken when an attack is detected, and the actions may vary depending on location of the detection (e.g., at the edge or at the cloud). FIG. 13 is a method or performing fleet-wide protection in accordance with some embodiments. At S1310, an industrial fleet protection system may receive information from a plurality of industrial assets. The information might include, for example, sensor data, local and global feature information, alerts (as decided at the industrial asset level), etc. At S1320, the industrial fleet protection system may execute both fleet-wide and edge level abnormal state detection logic. For example, the industrial fleet protection system might determine that a particular asset is under attack (even though the asset itself does not recognize that fact), that a particular asset is not under attack (even though the asset itself incorrectly thinks an attack is occurring), that the fleet is under attack (even no asset has detected an attack), etc. At S1330, the industrial fleet protection system may execute alert, boundary analysis, accommodation (e.g., to take corrective actions), severity analysis, and/or asset availability processes as appropriate based on the detected states.

Figure 14:
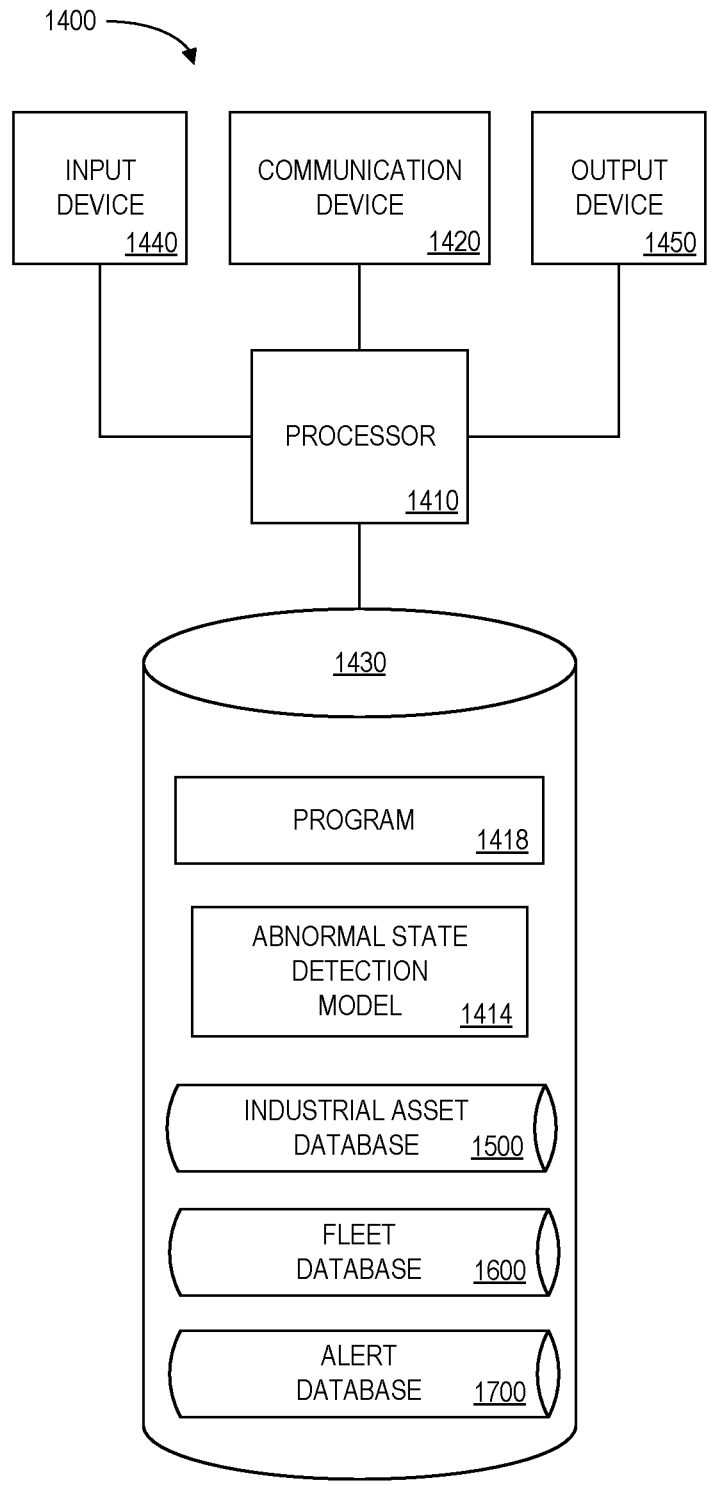
FIG. 14 is a block diagram of an industrial fleet protection platform according to some embodiments of the present invention.

The embodiments described herein may be implemented using any number of different hardware configurations. For example, FIG. 14 is a block diagram of an industrial fleet protection platform 1400 that may be, for example, associated with the system 100 of FIG. 1. The industrial fleet protection platform 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote monitoring nodes, user platforms, etc. The industrial fleet protection platform 1400 further includes an input device 1440 (e.g., a computer mouse and/or keyboard to input asset and/or fleet information) and/an output device 1450 (e.g., a computer monitor to render a display, provide alerts, transmit recommendations, and/or create reports). According to some embodiments, a mobile device, monitoring physical system, and/or PC may be used to exchange information with the industrial fleet protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or an abnormal state detection model 1414 for controlling the processor 1410. The processor 1410 performs instructions of the programs 1412, 1414, and thereby operates in accordance with any of the embodiments described herein. For example, the processor 1410 may receive information from a plurality of remote industrial assets and calculate, based on information received from multiple industrial assets, a current fleet-wide operation feature vector. The processor 1410 may then compare the current fleet-wide operation feature vector with a fleet-wide decision boundary (e.g., separating normal from abnormal operation of the industrial fleet). The processor 1410 may then automatically transmit a response (e.g., a cyber-attack threat alert or an adjustment to a decision boundary of an industrial asset) when a result of the comparison indicates abnormal operation of the industrial fleet.

The programs 1412, 1414 may be stored in a compressed, uncompiled and/or encrypted format. The programs 1412, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial fleet protection platform 1400 from another device; or (ii) a software application or module within the industrial fleet protection platform 1400 from another software application, module, or any other source.

In some embodiments (such as the one shown in FIG. 14), the storage device 1430 further stores an industrial asset database 1500, a fleet database 1600, and an attack database 1700. Examples of databases that may be used in connection with the industrial fleet protection platform 1400 will now be described in detail with respect to FIGS. 15 through 17. Note that the databases described herein are only examples, and additional and/or different information may be stored therein. Moreover, various databases might be split or combined in accordance with any of the embodiments described herein.

Referring to FIG. 15, a table is shown that represents the industrial asset database 1500 that may be stored at the industrial fleet protection platform 1400 according to some embodiments. The table may include, for example, entries associated with power plants, aviation engines, or other types of industrial assets. The table may also define fields 1502, 1504, 1506, 1508, 1510, 1512 for each of the entries. The fields 1502, 1504, 1506, 1508, 1510 may, according to some embodiments, specify: an industrial asset identifier 1502, a fleet identifier 1504, a description 1506, a global feature for asset 1508, an alert signal 1510, and a decision boundary for asset 1512. The industrial asset database 1500 may be created and updated, for example, off line (non-real time) when a new physical system is monitored or modeled and then be updated in substantially real time as the industrial assets are operating.

The industrial asset identifier 1502 may be, for example, a unique alphanumeric code identifying an industrial asset to be monitored (e.g., a jet turbine system, manufacturing plant, wind farm, etc.) as part of a fleet of assets associated with fleet identifier 1504. The description 1506 may describe the asset, and the global feature for asset 1508 may be calculated based on current operating values received from monitoring nodes at the asset. According to some embodiments, local feature for the asset might also be stored at the industrial asset database in addition to (or instead of) the global feature 1508. The alert signal 1510 might comprise a warning or attack alert that was generated by comparing the global feature 1508 with the decision boundary for asset 1512. According to some embodiments, the decision boundary 1512 might be locally determined at the asset or be over-ridden by an industrial fleet protection system.

Figure 16:
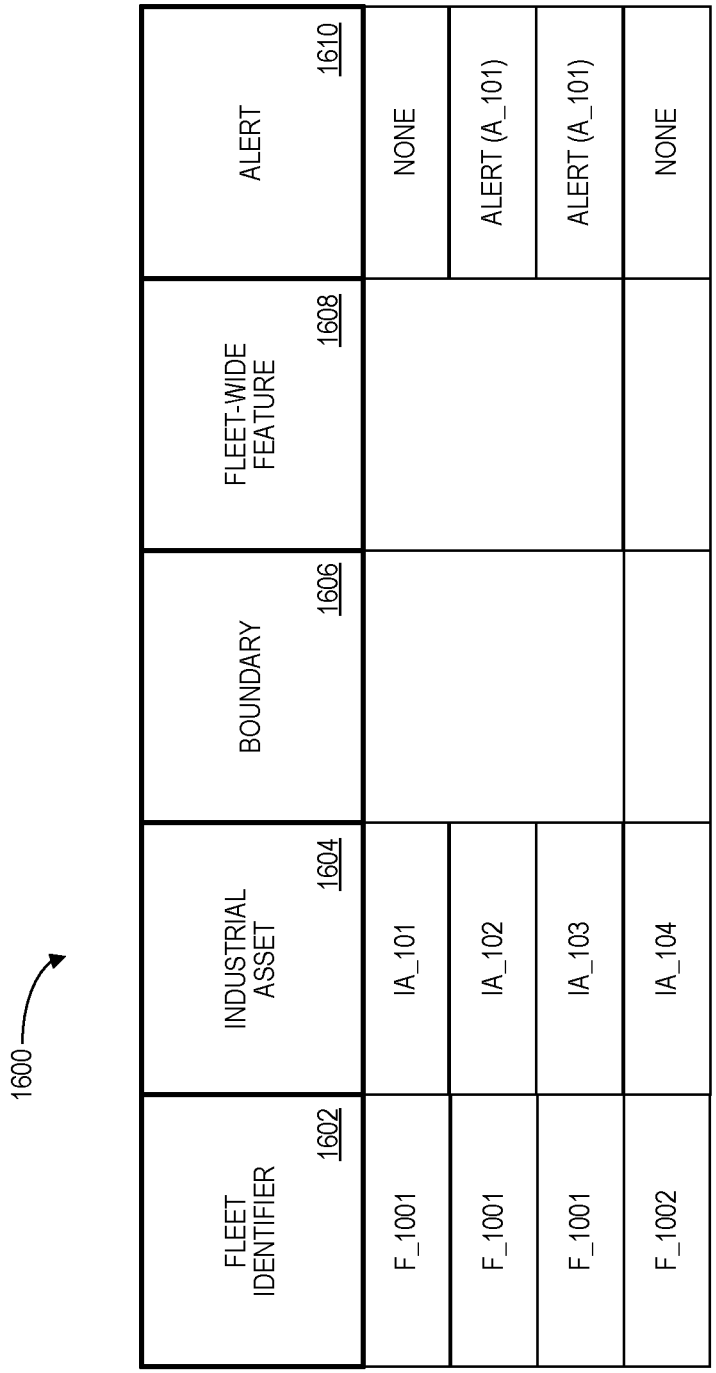
FIG. 16 is a tabular portion of a fleet database in accordance with some embodiments.

Referring to FIG. 16, a table is shown that represents the fleet database 1600 that may be stored at the industrial fleet protection platform 1400 according to some embodiments. The table may include, for example, entries associated a fleet of industrial assets. The table may also define fields 1602, 1604, 1606, 1608, 1610 for each of the entries. The fields 1602, 1604, 1606, 1608, 1610 may, according to some embodiments, specify: a fleet identifier 1602, an industrial asset identifier 1604, a boundary 1606, a fleet-wide feature 1608, and an alert 1610. The fleet database 1600 may be created and updated, for example, offline (non-real time) when a new physical system is monitored or modeled and then be updated in substantially real-time as industrial assets are operating.

The fleet identifier 1602 may be, for example, a unique alphanumeric code identifying a fleet of industrial assets to be monitored and may be based on, or associated with, the fleet identifier 1504 in the industrial asset database 1500. The industrial asset identifier 1604 may be, for example, a unique alphanumeric code identifying an industrial asset to be monitored and may be based on, or associated with, the industrial asset identifier 1502 in the industrial asset database 1500. The boundary 1606 might separate normal operation of the fleet from abnormal operation of the fleet and may be calculated in accordance with any of the methods described herein with respect to local industrial asset boundaries. The fleet-wide feature 1608 represents current operation of the fleet (and may be constructed using portions of a number of different global features 1508 received from industrial assets. The fleet-wide feature 1608 may be compared to the boundary 1606 and be used to generate one or more alerts 1610 (e.g., asset-specific alerts, fleet-wide alerts, warning, etc.).

Referring to FIG. 17, a table is shown that represents the alert database 1700 that may be stored at the industrial fleet protection platform 1100 according to some embodiments. The table may include, for example, entries identifying alerts generated in connection with a fleet of industrial assts. The table may also define fields 1702, 1704, 1706, 1708, 1710 for each of the entries. The fields 1702, 1704, 1706, 1708, 1710 may, according to some embodiments, specify: an alert identifier 1702, a description 1704, an industrial asset identifier 1706, a fleet identifier 1708, and a date and time 1710. The alert database 1700 may be created and updated, for example, in substantially real-time as industrial assets are operating.

The alert identifier 1702 may be, for example, a unique alphanumeric code identifying an alert that was automatically generated in connection with a fleet of industrial assets, and the description 1704 might describe why the alert was transmitted (e.g., as a result of detection of a fleet-wide or asset-specific attack). The industrial asset identifier 1706 may be, for example, a unique alphanumeric code identifying an industrial asset to be monitored and may be based on, or associated with, the industrial asset identifier 1502 in the industrial asset database 1500 or the industrial asset identifier 1604 in the fleet database 1600. The fleet identifier 1708 may be, for example, a unique alphanumeric code identifying a fleet of industrial assets to be monitored and may be based on, or associated with, the fleet identifier 1504 in the industrial asset database 1500 or the fleet identifier 1602 in the fleet database 1600. The date and time 1710 might indicate when the alert was generated (e.g., when the attack was detected).

Thus, embodiments may provide cyber security which is an important function in the protection of assets, such as power plant equipment. In some embodiments, plant global and local features are computed at the onsite power plant (e.g., edge level). Selected plant features may then be used to form a fleet-wide feature vector. This combined vector may represent significant information which will allow an algorithm to determine local (asset) cyber-attacks, fleet attacks, and/or predict asset availability.

Some embodiments described herein may enable use of signature analysis for attacks. While attacks on critical infrastructures are continually growing, notification about such attacks tends to spread slowly (e.g., because of relatively low visibility as compared to consumer data cyber-attacks, a lack of awareness about an attack, a general desire to not let the public know that a company was at attacked, etc.). Attack signatures may leverage the data accumulated from the industrial asset sites (and improve the security of other sites) without needing to provide attack specifics. The ability to generate threat signatures at the domain layer, and apply these signatures to other industrial asset sites, may significantly improve fleet security.

Embodiments described herein may use terabytes of data to assess if individual plants have been attacked. Note that fleet detection is generally considered slow as compared to local or edge detection. To improve performance of the fleet detection, embodiments may condense plant operating data in feature space. This reduces the overall amount of data and lets an algorithm compare real-time features to the normal operating feature space and attack space. The local plant processing (edge processing) may compute the features from real-time data. The real time data, features, and attack decisions may then be transmitted to the cloud for validation. Additionally, local feature boundaries may be transmitted to the cloud for verification. Note that this might be implemented for stealthy attacks because of the time scales and inter-dependencies between multiple power plants. The cloud processing may transmit boundaries to the local edge processing via a bi-directional data transmission interface. Note that boundaries can be updated over time using boundary adaptation techniques.

According to some embodiments, key, selected plant features are combined into a fleet-wide feature vector. This vector may then be compared to fleet boundaries to determine a fleet attack decision. Some embodiments described herein may provide:
  a local boundary updated from fleet decision analytics;
  a local accommodation loop enabled from fleet decision analytics;
  a reconfirmation or validation of local attack decisions;
  a combination of individual plant features into a broader fleet feature vector;
  a declaration of when an asset or fleet of assets have been attacked;
  a prediction of when an asset or fleet of assets will become unavailable; and
  inputs into a dispatch or demand response algorithm for system resiliency.

Embodiments may also let a grid Independent Service operator ("ISO") be prepared for significant grid disturbance effects. The predictive nature of assets coming offline may let the ISO dispatch other power generation assets to meet the load demand.

Thus, embodiments described herein may improve the cyber physical coordination between the fleet monitoring and local plant assets. Additional commercial advantages may be enabled by collection of cyber-attack data from the fleet. The knowledge of frequent (or rising) attacks on assets in specific regions can be used to provide warnings to other assets and/or other fleets in those areas. Embodiments also provide for a potential feedback loop to an engineering team working with an asset. If certain vulnerabilities are continually being exploited in the cyber-physical layer, the information can be passed back to the engineering team, which can adjust the design to make the system more inherently robust.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

According to some embodiments, information about attack statuses may be interwoven between different industrial asset fleets. For example, one fleet might be aware of the status of other assets in other fleets, and such an approach might further help thwart coordinated cyber-threats. In addition to automatic threat detection, some embodiments described herein might provide systems with an additional cyber layer of defense and be deployable without custom programming (e.g., when using operating data). Some embodiments may be sold with a license key and could be incorporated as monitoring service. For example, fleet boundaries might be periodically updated when equipment at an industrial asset plant is upgraded.

Figure 18:
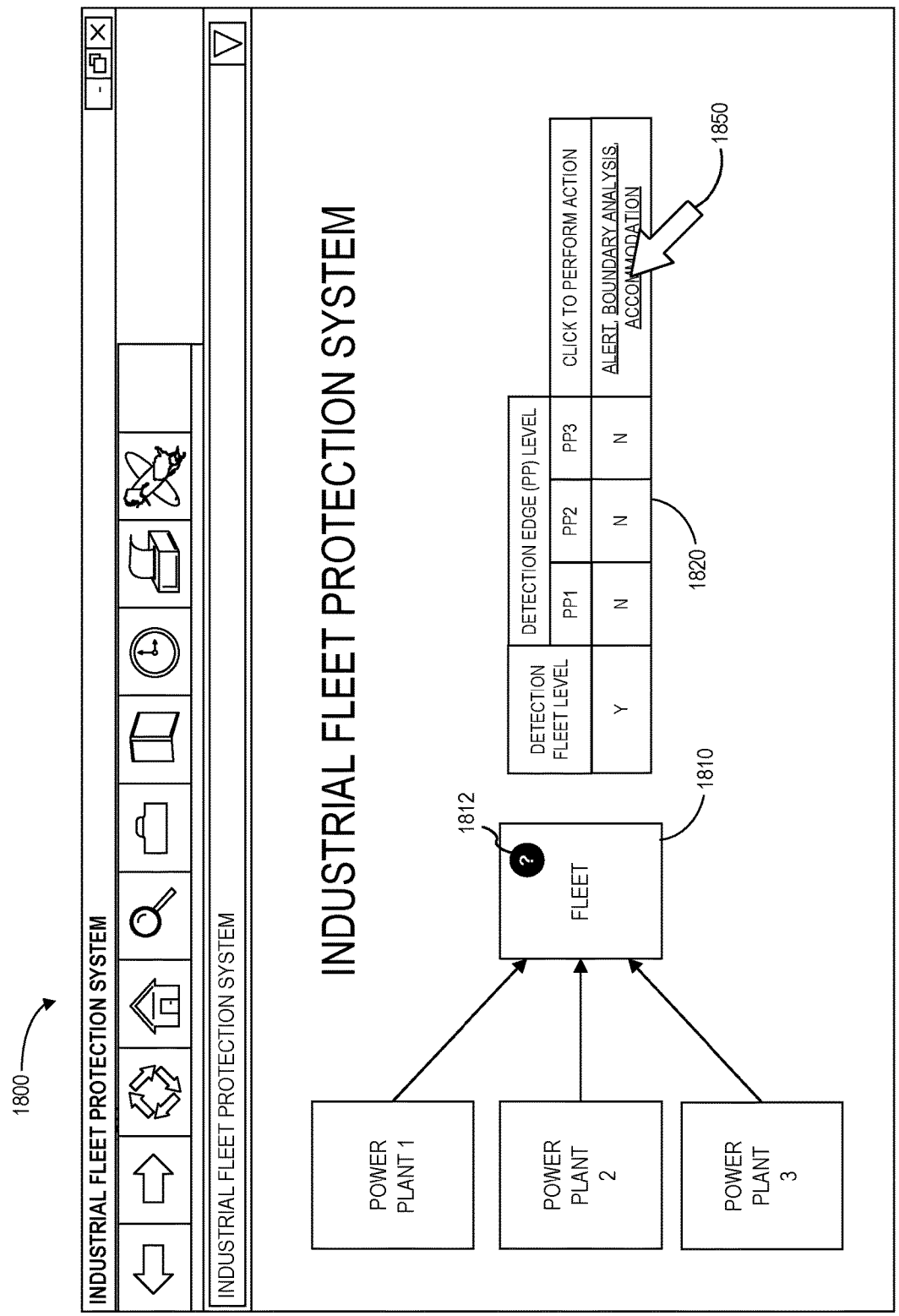
FIG. 18 is an interactive user interface display according to some embodiments.

Note that alert responses may be automatically selected by a system and/or be based on user input. For example, FIG. 18 illustrates an interactive Graphical User Interface ("GUI") display 1800 that might display a graphical representation of a fleet 1810 along with icons 1812 that, when selected by the user, result in the display of additional information (e.g., via a pop-up window). The display may also include a user input portion or area 1820 that may be used to initiate actions. For example, a user might us a computer mouse icon 1850 or touchscreen to select an "Accommodation" icon to initiate an accommodation process, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect a fleet of industrial assets, comprising:

a communication port to exchange information with a plurality of remote industrial assets comprising the fleet of industrial assets, wherein each remote industrial asset is geographically remote from at least one other industrial asset and includes a set of monitoring nodes; and an industrial fleet protection system coupled to the communication port and including a computer processor to:
(i) receive information from each of the plurality of remote industrial assets, the information from each industrial asset including at least a current feature vector generated based on information from monitoring nodes of that industrial asset and a normal/abnormal status indication for that industrial asset,
(ii) calculate, based on information received from multiple industrial assets, a current fleet-wide operation feature vector,
(iii) compare the current fleet-wide operation feature vector with a fleet-wide decision boundary, the fleet-wide decision boundary separating normal operation of the fleet of industrial assets from abnormal operation of the fleet of industrial assets, and
(iv) automatically transmit a response when a result of the comparison indicates abnormal operation of the fleet of industrial assets, the response including a transmittal, from the industrial fleet protection system to at least one of the industrial assets, an adjustment to an industrial asset decision boundary.

2. The system of claim 1, wherein the information received from the plurality of remote industrial assets is received via a cloud-based security platform.

3. The system of claim 1, wherein the industrial fleet protection system comprises a cloud-based monitoring system.

4. The system of claim 1, wherein the information received from the plurality of industrial assets includes at least one of: an abnormal state alert, an industrial asset feature vector, an industrial asset global feature vector, an industrial asset decision boundary, a series of monitoring node values, a cyber-attack risk probability, a per-asset risk index, and a real-time signature.

5. The system of claim 1, wherein an abnormal state alert is received from a first industrial asset and the automatic response is transmitted to a second industrial asset.

6. The system of claim 1, wherein the automatic response includes transmitting, from the industrial fleet protection system to at least one of the industrial assets, at least one of: a potential attack type, a potential attack signature, potential attack time characteristics, an indication of a fleet-wide attack, an indication of an attack limited to a subset of the industrial assets, and an indication that no attack is currently being detected.

7. The system of claim 1, wherein abnormal operation of the fleet of industrial assets is associated with at least one of: a cyber-attack, a threat warning, and a predicted cyber-attack.

8. The system of claim 1, wherein calculation of the current fleet-wide operation feature vector is facilitated via dimensionality reduction techniques.

9. The system of claim 8, wherein the plurality of industrial assets are power plants and the dimensionality reduction techniques are applied to correlated features across power plants including at least one of: generator features, power factors, voltages, current, and generator speed.

10. The system of claim 1, wherein the industrial fleet protection system is further to: predict asset availability, perform a severity analysis, execute an accommodation process, and confirm an abnormal state alert received from an industrial asset.

11. The system of claim 1, wherein the industrial assets are associated with at least one of: power plants, gas turbines, heat recovery steam generators, balance of plant controls, steam turbines, aviation engines, ship propulsion systems, locomotive engines, dams, and elements of a power grid.

12. The system of claim 1, wherein abnormal operation is associated with a cyber-attack and the industrial fleet protection system detects the cyber-attack even when none of the industrial assets detect a cyber-attack.

13. A system to protect an industrial asset that is a member of a fleet of industrial assets, wherein each industrial asset is geographically remote from at least one other industrial asset, comprising:

a normal space data source storing, for each of a plurality of monitoring nodes, a series of normal monitoring node values over time that represent normal operation of the industrial asset;

an abnormal space data source storing, for each of the plurality of monitoring nodes, a series of abnormal monitoring node values over time that represent an abnormal operation of the industrial asset;

an abnormal state detection model creation computer, coupled to the normal space data source and the abnormal space data source, to:
 (i) receive the series of normal monitoring node values and generate a set of normal feature vectors,
 (ii) receive the series of abnormal monitoring node values and generate a set of abnormal state feature vectors,
 (iii) automatically calculate a decision boundary for an abnormal state detection model based on the set of normal feature vectors and the set of threatened feature vectors, the decision boundary separating normal operation of the industrial asset from abnormal operation of the industrial asset, and
 (iv) automatically adjust the decision boundary based on information received from a remote industrial fleet protection system;

a plurality of real-time monitoring node signal inputs to receive streams of monitoring node signal values over time that represent a current operation of the industrial asset; and a threat detection computer platform, coupled to the plurality of real-time monitoring node signal inputs and the threat detection model creation computer, to:
 (i) receive the streams of monitoring node signal values,
 (ii) for each stream of monitoring node signal values, generate a current monitoring node feature vector,
 (iii) select an appropriate decision boundary for each monitoring node, the appropriate decision boundary separating a normal state from an abnormal state for that monitoring node,
 (iv) compare each generated current monitoring node feature vector with the selected corresponding appropriate decision boundary, and
 (v) automatically transmit at least one current monitoring node feature vector and normal/abnormal status indication to the industrial fleet protection system based on results of said comparisons.

14. The system of claim 13, wherein the information automatically transmitted to the industrial fleet protection system includes at least one of: an abnormal state alert, an industrial asset feature vector, an industrial asset global feature vector, an industrial asset decision boundary, a series of monitoring node values, a cyber-attack risk probability, a per-asset risk index, and a real-time signature.

15. The system of claim 13, wherein the information transmission is performed using at least one of: a cloud-based system, an edge-based system, a wireless system, a wired system, a secured network, and a communication system.

16. The system of claim 13, wherein an abnormal state is associated with at least one of: an actuator attack, a controller attack, a monitoring node attack, a plant state attack, spoofing, physical damage, unit availability, a unit trip, a loss of unit life, and asset damage requiring at least one new part.

17. The system of claim 13, wherein the threat detection computer platform is further to automatically generate a cyber-threat alert based on: (1) the results of the comparisons, and (2) information received from the industrial fleet protection system including at least one of: a potential attack type, a potential attack signature, potential attack time characteristics, an indication of a fleet-wide attack, an indication of an attack limited to a subset of the industrial assets, and an indication that no attack is currently being detected.

18. A computerized method to protect a fleet of industrial assets, comprising:

receiving, at a cloud-based industrial fleet protection system, information from each of a plurality of remote industrial assets comprising the fleet of industrial assets, wherein each remote industrial asset is geographically remote from at least one other industrial asset and includes a set of monitoring nodes, the information from each industrial asset including at least a current feature vector generated based on information from monitoring nodes of that industrial asset and a normal/abnormal status indication for that industrial asset;

calculating, based on information received from multiple industrial assets, a current fleet-wide operation feature vector;

comparing the current fleet-wide operation feature vector with a fleet-wide decision boundary, the fleet-wide decision boundary separating normal operation of the fleet of industrial assets from abnormal operation of the fleet of industrial assets; and automatically transmitting a response when a result of the comparison indicates abnormal operation of the fleet of industrial assets, the response including a transmittal, from the industrial fleet protection system to at least one of the industrial assets, an adjustment to an industrial asset decision boundary.

19. The method of claim 18, wherein the information received from the plurality of industrial assets includes at least one of: an abnormal state alert, an industrial asset feature vector, an industrial asset global feature vector, an industrial asset decision boundary, a series of monitoring node values, a cyber-attack risk probability, a per-asset risk index, and a real-time signature.

20. The method of claim 18, wherein an abnormal state alert is received from a first industrial asset and the automatic response is transmitted to a second industrial asset.

* * * * *